United States Patent
Kim et al.

(10) Patent No.: US 6,846,594 B2
(45) Date of Patent: Jan. 25, 2005

(54) LITHIUM SECONDARY BATTERY

(75) Inventors: Jin Sung Kim, Cheonan (KR); Jun Won Kang, Cheonan (KR); Hak Soo Kim, Daegu (KR); Jong Seob Kim, Daejeon (KR)

(73) Assignees: Samsung SDI Co., Ltd., Suwon (KR); Cheil Industries Inc., Kumi (KR)

( * ) Notice: Subject to any disclaimer, the term of this patent is extended or adjusted under 35 U.S.C. 154(b) by 0 days.

(21) Appl. No.: 10/439,636

(22) Filed: May 15, 2003

(65) Prior Publication Data

US 2004/0058250 A1 Mar. 25, 2004

(30) Foreign Application Priority Data

Sep. 17, 2002 (KR) .................. 10-2002-0056488

(51) Int. Cl.[7] .......................... H01M 10/40; H01M 4/48
(52) U.S. Cl. .............. 429/328; 429/231.1; 429/231.95; 429/322; 429/329; 429/331
(58) Field of Search ................. 429/328, 329, 429/322, 331, 231.95, 231.1

(56) References Cited

U.S. PATENT DOCUMENTS

| | | | |
|---|---|---|---|
| 4,489,144 A | * 12/1984 | Clark | 429/336 |
| 5,478,673 A | 12/1995 | Funatsu | |
| 5,486,431 A | * 1/1996 | Tuttle et al. | 429/66 |
| 6,174,629 B1 | 1/2001 | Gan et al. | |
| 6,221,533 B1 | 4/2001 | Kusumoto et al. | |
| 6,255,021 B1 | * 7/2001 | Kusumoto et al. | 429/328 |

FOREIGN PATENT DOCUMENTS

| | | |
|---|---|---|
| JP | 6-333596 | 12/1994 |
| JP | 7-320779 | 12/1995 |
| JP | 8-64238 | 3/1996 |
| JP | 8-32132 | 12/1996 |
| JP | 9-73918 | 3/1997 |
| WO | WO 01/33657 A1 | 5/2001 |

OTHER PUBLICATIONS

S. Megahed et al, "Lithium–ion Rechargeable Batteries"; Journal of Power Sources (51) (1994), Jun. pp. 79–104.

C.R. Yang et al, "Composition Analysis of the Passive Film on the Carbon Electrode of a Lithium–Ion Battery with an EC–Based Electrolyte", Journal of Power Sources (72) (1998), pp. 66–70, no month.

(List continued on next page.)

*Primary Examiner*—John S. Maples
(74) *Attorney, Agent, or Firm*—Christie, Parker and Hale, LLP

(57) ABSTRACT

Disclosed is a lithium secondary battery comprising a positive electrode including a material that is capable of reversible intercalation/deintercalation of lithium ions as a positive active material; a negative electrode including a material that is capable of reversible intercalation/deintercalation of lithium ions as a negative active material; and an electrolyte including a lithium salt, a carbonate-based organic solvent, and an isoxazole compound of the following formula (1):

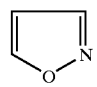

(1)

18 Claims, 2 Drawing Sheets

OTHER PUBLICATIONS

Tobishima, S., et al., *Ethylene carbonate/propylene carbonate/2–methyl–tetrahydrofuran ternary mixed solvent electrolyte for rechargeable lithium/amorphous $V_2O_5$–$P_2O_5$ cells*, ElectrochimicaActa., vol. 42, No. 11, pp 1709–1716, XP004056808, May, 1997.

Li, G., et al., *Further identification to the SEI film on Ag electrode in lithium batteries by surface enhanced Raman scattering (SERS)*, Journal of Power Sources, vol. 104, 2002, pp 190–194, XP004334337, no month.

Arakawa, M., et al., *Effect of purification of 2–methyltetrahydrofuran/ethylene carbonate mixed solvent electrolytes on cyclability of lithium metal anodes for rechargeable cells*, Journal of Applied Electrochemistry, vol. 29, 1999, pp 1191–1196, XP000854430, no month.

Aurbach, D., et al., *An analysis of rechargeable lllithium–ion batteries after prolonged cycling*, Electrochimica Acta, vol. 47, 2002, pp 1899–1911,. XP002266875, no month.

European Search Report dated Feb. 5, 2004 for corresponding International Application EP 03 09 0163.

* cited by examiner

LITHIUM SECONDARY BATTERY

CROSS REFERENCE TO RELATED APPLICATION

This application claims priority of Korean patent application No. 2002-56488 filed in the Korean Intellectual Property Office on Sep. 17, 2002, the disclosure of which is incorporated herein by reference.

FIELD OF THE INVENTION

The present invention relates to a lithium secondary battery, and more particularly, to a lithium secondary battery capable of preventing the thickness of the battery from expanding when the battery is charged at room temperature, or when the battery is stored at a high temperature after charging.

BACKGROUND OF THE INVENTION

Due to recent trends toward more compact and lighter portable electronic equipment, there has been a growing need to develop a high performance and large capacity battery to power this portable electronic equipment. In particular, there has been extensive research to provide lithium secondary batteries with good safety characteristics and improved electrochemical properties. Lithium secondary batteries use materials that reversibly intercalate or deintercalate lithium ions during charge and discharge reactions for both positive and negative active materials. The positive active materials include lithium metal oxide and the negative materials include lithium metals, lithium-containing alloys, or materials that are capable of reversible intercalation/deintercalation of lithium ions such as crystalline or amorphous carbons, or carbon-containing composites.

The lithium secondary batteries are classified as lithium ion secondary batteries, lithium ion polymer batteries, and lithium polymer batteries according to the type of separator and electrolyte, and they are further classified as cylindrical-type, prismatic-type, and coin-type batteries according to their shape. FIG. 1 shows a sectional view of a lithium ion secondary battery 3. A positive electrode 5, a finely porous polymer film separator 7, and a negative electrode 6 are laminated in this order, and these components are rolled up by a winder to prepare an electrode assembly 4. This electrode assembly 4 is put in a case 8, electrolyte is then injected therein, and thereafter it is sealed with a cap plate 11 to fabricate a lithium ion secondary battery 3.

The average discharge voltage of a lithium secondary battery is about 3.6 to 3.7V, which is higher than other alkali batteries, Ni—MH batteries, Ni—Cd batteries, etc. However, an electrolyte that is electrochemically stable in the charge and discharge voltage range of 0 to 4.2V is required in order to generate such a high driving voltage. As a result, a mixture of non-aqueous carbonate-based solvents, such as ethylene carbonate, dimethyl carbonate, diethyl carbonate, etc., is used as an electrolyte. However, such an electrolyte has significantly lower ion conductivity than an aqueous electrolyte that is used in a Ni—MH battery or a Ni—Cd battery, thereby resulting in the deterioration of battery characteristics during charging and discharging at a high rate.

During the initial charge of a lithium secondary battery, lithium ions, which are released from the lithium-transition metal oxide positive electrode of the battery, are transferred to a carbon negative electrode where the ions are intercalated into the carbon. Because of its high reactivity, lithium reacts with the carbon negative electrode to produce $Li_2CO_3$, LiO, LiOH, etc., thereby forming a thin film on the surface of the negative electrode. This film is referred to as an organic solid electrolyte interface (SEI) film. The organic SEI film formed during the initial charge not only prevents the reaction between lithium ions and the carbon negative electrode or other materials during charging and discharging, but it also acts as an ion tunnel, allowing the passage of only lithium ions. The ion tunnel prevents disintegration of the structure of the carbon negative electrode, which is caused by co-intercalation of organic solvents having a high molecular weight along with solvated lithium ions into the carbon negative electrode.

Once the organic SEI film is formed, lithium ions do not react again with the carbon electrode or other materials, such that an amount of lithium ions is maintained. That is, carbon from the negative electrode reacts with the electrolyte during the initial charging, thus forming a passivation layer such as an organic SEI film on the surface of the negative electrode such that the electrolyte solution no longer decomposes, and stable charging and discharging are maintained (*J. Power Sources*, 51(1994), 79–104). As a result, in the lithium secondary battery, there is no irreversible formation reaction of the passivation layer, and a stable cycle life after the initial charging reaction is maintained.

However, gases are generated inside the battery due to decomposition of the carbonate-based organic solvent during the organic SEI film-forming reaction (*J. Power Sources*, 72(1998), 66–70). These gases include $H_2$, CO, $CO_2$, $CH_4$, $C_2H_6$, $C_3H_8$, $C_3H_6$, etc. depending on the type of non-aqueous organic solvent and negative active material used. The decomposition reaction schemes are as follows:

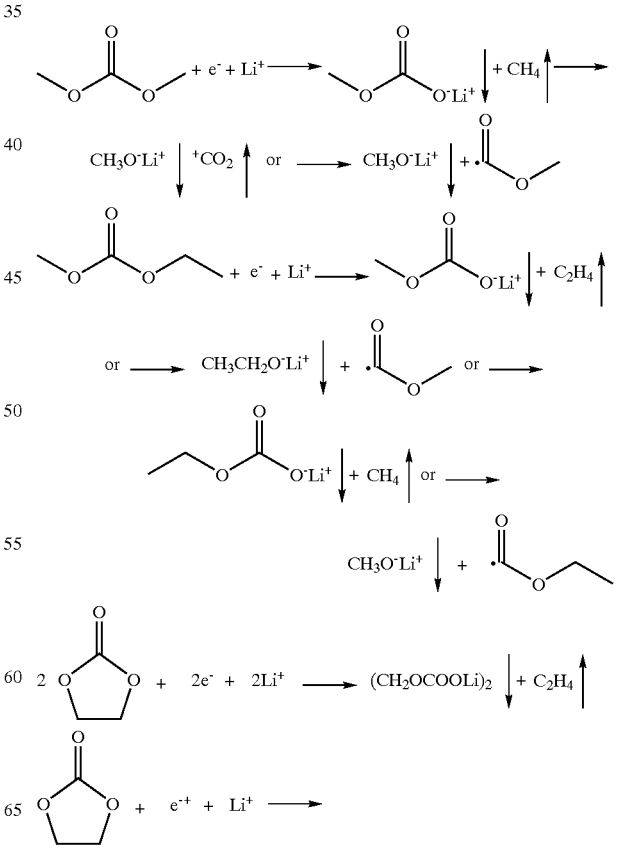

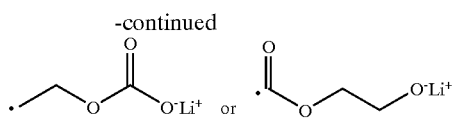

The thickness of the battery increases during charging due to the generation of gas inside the battery, and the passivation layer slowly disintegrates by electrochemical energy and heat energy, which increases with the passage of time when the battery is stored at a high temperatures after it is charged. Accordingly, a side reaction in which an exposed surface of the negative electrode reacts with surrounding electrolyte occurs continuously. Furthermore, the internal pressure of the battery increases with this generation of gas. The increase in the internal pressure induces the deformation of prismatic and lithium polymer batteries. As a result, regional differences in the cohesion among electrodes inside the electrode assembly (positive and negative electrode, and separator) of the battery occur, thereby deteriorating the performance and safety of the battery and making it difficult to mount the lithium secondary battery set into electronic equipment.

For solving the internal pressure problem, there is disclosed a method in which the safety of a secondary battery including a non-aqueous electrolyte is improved by mounting a vent or a current breaker for ejecting internal electrolyte solution when the internal pressure is increased above a certain level. However, a problem with this method is that mis-operation may result from an increase in internal pressure itself.

Furthermore, a method in which the SEI-forming reaction is changed by injecting additives into an electrolyte so as to inhibit the increase in internal pressure is known. For example, Japanese Patent Laid-open No. 97-73918 discloses a method in which high temperature storage characteristics of a battery are improved by adding 1% or less of a diphenyl picrylhydrazyl compound to the electrolyte. Japanese Patent Laid-open No. 96-321312 discloses a method in which cycle life and long-term storage characteristics are improved using 1 to 20% of an N-butyl amine based compound in an electrolyte. Japanese Patent Laid-open No. 96-64238 discloses a method in which storage characteristics of a battery are improved by adding $3\times10^{-4}$ to $3\times10^{-3}$ M of calcium salt to the electrolyte. Japanese Patent Laid-open No. 94-333596 discloses a method in which storage characteristics of a battery are improved by adding an azo-based compound to inhibit the reaction between an electrolyte and a negative electrode of the battery. In addition, Japanese Patent Laid-open No. 95-320779 discloses a method in which $CO_2$ is added to an electrolyte, and Japanese Patent Laid-open No. 95-320779 discloses a method in which sulfide-based compounds are added to an electrolyte in order to prevent the electrolyte from decomposing.

Such methods as described above for inducing the formation of an appropriate film on a negative electrode surface such as an organic SEI film by adding a small amount of organic or inorganic materials are used in order to improve the storage characteristics and safety of a battery. However, there are various problems with these methods. For example, the added compound decomposes or forms an unstable film by interacting with the carbon negative electrode during the initial charge and discharge due to inherent electrochemical characteristics, resulting in the deterioration of the ion mobility in electrons. Also, gas is generated inside the battery such that there is an increase in internal pressure, resulting in significant deterioration of the storage, safety, cycle life, and capacity characteristics of the battery.

SUMMARY OF THE INVENTION

In one embodiment, the present invention provides a lithium secondary battery comprising
- a positive electrode including a material that is capable of reversible intercalation/deintercalation of lithium ions as a positive active material;
- a negative electrode including a material selected from the group consisting of lithium metal, lithium-containing metal, and a material that is capable of reversible intercalation/deintercalation of lithium ions as a negative active material; and
- an electrolyte including a lithium salt, a carbonate-based organic solvent, and an isoxazole compound of the following formula (1):

(1)

The present invention also provides a method of preparing a lithium secondary battery, comprising:
- providing a positive electrode including a material that is capable of reversible intercalation/deintercalation of lithium ions as a positive active material;
- providing a negative electrode including a material selected from the group consisting of lithium metal, lithium-containing metal, and a material that is capable of reversible intercalation/deintercalation of lithium ions as a negative active material;
- preparing an electrode assembly containing the positive and negative electrodes;
- putting the electrode assembly in a battery case; and
- injecting an electrolyte including a lithium salt, a carbonate-based organic solvent, and an isoxazole compound of the formula (1) into the battery case to fabricate a lithium secondary battery.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
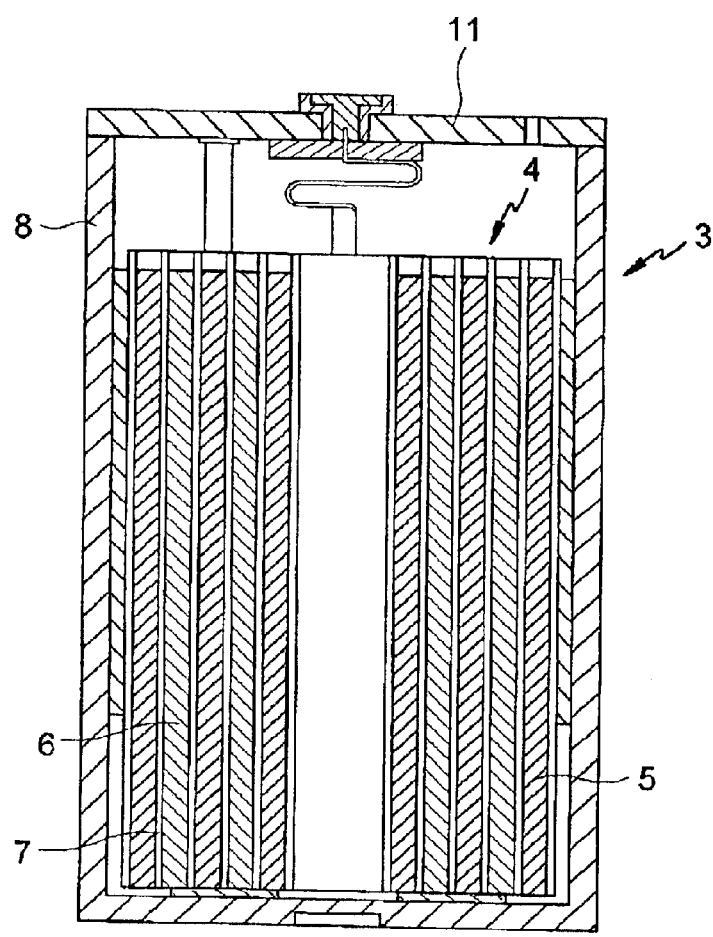
FIG. 1 is a sectional view of a prismatic lithium secondary battery.

In the following detailed description, only the preferred embodiment of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive.

According to one embodiment of the present invention, the lithium secondary battery of the present invention uses materials that are capable of reversible intercalation/ deintercalation of lithium ions, as positive active materials and uses a material selected from the group consisting of lithium metal, lithium-containing metal, and a material that is capable of reversible intercalation/deintercalation of lithium ions as a negative active material. Examples of positive active materials include lithiated intercalation compounds such as lithium metal oxides and lithium chalcogenide compounds.

Examplary lithiated intercalation compounds include the following compounds represented by the formulas (2) to (14):

$$Li_xMn_{1-y}M_yA_2 \quad (2)$$

$$Li_xMn_{1-y}M_yO_{2-z}X_z \quad (3)$$

$$Li_xMn_2O_{4-z}X_z \quad (4)$$

$$Li_xMn_{2-y}M_yA_4 \quad (5)$$

$$Li_xCo_{1-y}M_yA_2 \quad (6)$$

$$Li_xCo_{1-y}M_yO_{2-z}X_z \quad (7)$$

$$Li_xNi_{1-y}M_yA_2 \quad (8)$$

$$Li_xNi_{1-y}M_yO_{2-z}X_z \quad (9)$$

$$Li_xNi_{1-y}CO_yO_{2-z}X_z \quad (10)$$

$$Li_xNi_{1-y-z}Co_yM_zA_\alpha \quad (11)$$

$$Li_xNi_{1-y-z}Co_yM_zO_{2-\alpha}X_\alpha \quad (12)$$

$$Li_xNi_{1-y-z}Mn_yM_zA_\alpha \quad (13)$$

$$Li_xNi_{1-y-z}Mn_yM_zO_{2-\alpha}X_\alpha \quad (14)$$

wherein $$0.9 \leq x \leq 1.1; \ 0 \leq y \leq 0.5; \ 0 \leq z \leq 0.5; \ 0 \leq \alpha \leq 2;$$

M is at least one element selected from the group consisting of Al, Ni, Co, Mn, Cr, Fe, Mg, Sr, V, and rare earth elements;

A is at least one element selected from the group consisting of O, F, S, and P; and X is at least one element selected from the group consisting of F, S, and P.

The average particle size of these lithiated intercalation compounds is 1 to 50 μm, preferably 5 to 20 μm, and more preferably 5 to 10 μm.

In addition, the positive electrode preferably includes TiS, MoS, organic sulfide compounds, or organic polysulfide compounds.

The negative active material can be a lithium metal, a lithium-containing alloy, a material that are capable of reversible intercalation/deintercalation of lithium ions (carbon-containing composite, carbonaceous material) or the like. Exemplary lithium-containing alloy includes alloys of lithium with Al, Si, Sn, Pb, Zn, Bi, In, Mg, Ga, and Cd. Exemplary carbonaceous materials include amorphous and crystalline carbon, graphitized carbon fiber, and graphitized mesocarbon microbeads. Examples of amorphous carbon include soft carbon (low-temperature calcinated carbon), and hard carbon (high-temperature calcinated carbon). Examples of crystalline carbon include natural graphite and artificial graphite having plate, sphere, and fiber shapes.

The electrolyte includes a lithium salt, a carbonate-based organic solvent, and an isoxazole compound of the above formula (1).

The lithium salt acts in a battery as a supply source of lithium ions, making the basic operation of a lithium secondary battery possible. The lithium salt is preferably at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural numbers), $LiCl$, and $LiI$.

The concentration of the lithium salt preferably ranges from 0.6 to 2.0M. When the concentration of the lithium salt is less than 0.6M, the electrolyte performance deteriorates due to its lack of ionic conductivity. When the concentration of the lithium salt is greater than 2.0M, the lithium ion mobility deteriorates due to an increase of the electrolyte viscosity, and low temperature performance also deteriorates.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), methylisopropyl carbonate (MIC), ethylbutyl carbonate(EBC), diisopropyl carbonate (DIC), dibutyl carbonate (DBC), ethylene carbonate (EC), propylene carbonate (PC), and/or butylene carbonate (BC). These carbonate-based solvents improve battery performance factors such as initial charge/discharge efficiencies compared with ether- and ester-based solvents when being used along with the isoxazole additive compound.

In the present invention, the cyclic carbonate and the chain carbonate are preferably mixed together in a volume ratio of 1:1 to 1:9. When the cyclic carbonate and the chain carbonate are mixed in the volume ratio of 1:1 to 1:9, and the mixture is used as an electrolyte, the electrolyte performance may be enhanced.

In addition, the electrolyte of the present invention may further include mixtures of carbonate-based solvents and aromatic hydrocarbon solvents. The aromatic hydrocarbon solvent may be benzene or a compound represented by the following formula (15):

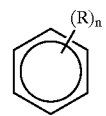

(15)

wherein R is halogen or C1–10 alkyl, and n is an integer ranging ram 1 to 5, and preferably 1 to 3.

Examples of aromatic hydrocarbon solvents include benzene, chlorobenzene, nitrobenzene, fluorobenzene, toluene, trifluorotoluene, and xylene. The carbonate-based solvents and the aromatic hydrocarbon solvents are preferably mixed together in a volume ratio of 1:1 to 10:1. When a carbonate-based solvent and an aromatic hydrocarbon solvent are mixed with each other in the aforementioned volume ratio, and the mixture is used as an electrolyte, the electrolyte performance may be enhanced.

The isoxazole additive compound represented by the formula (1) is added to the carbonate-based solvent including the lithium salt to prepare the electrolyte of the present invention. The order of addition of the lithium salt and isoxazole additive compound is not important.

The isoxazole additive compound is added in an amount of 0.1 to 10 wt %, and preferably 0.5 to 2 wt %, based on the total amount of the electrolyte. The inhibition of the generation of gas inside a battery is not likely when the compound is used in an amount of less than 0.1 wt %. Cycle life characteristics of the battery decrease in accordance with the increase in the amount of compound used when the compound is used in an amount exceeding 10 wt %.

The isoxazole additive compound may be used along with hexafluorobenzene. The former and the latter compounds are preferably used in a mixed volume ratio of 10:1 to 1:10, and more preferably 1:1 to 1:5.

The compound additive, isoxazole, or hexafluorobenzene decomposes earlier than an electrolytic organic solvent during initial charging to react with lithium ions resulting in the formation of an organic SEI film, thereby inhibiting the decomposition of the electrolytic organic solvent. Therefore, the increase in the thickness of a prismatic battery or lithium polymer battery can be prevented during charging at room temperature or during high temperature storage after charging, since the generation of gas caused by the decomposition of the electrolytic organic solvent is inhibited during initial charging. In addition, the deterioration of the charge and discharge capacity of the lithium secondary battery can be prevented, cycle life characteristics can be enhanced, and storage characteristics at high temperatures can be improved.

Among the carbonate-based solvents, propylene carbonate reacts with negative active materials during initial charging, resulting in deterioration of initial capacity and charge/discharge efficiencies.

An electrolyte for a lithium secondary battery of the present invention is stable at a temperature ranging from −20 to 60° C., thereby maintaining stable characteristics of the battery even at a voltage of 4V. In the present invention, the lithium secondary battery includes all lithium secondary batteries including lithium ion batteries, lithium polymer batteries, etc.

According to another embodiment, the present invention also provides a method of preparing a lithium secondary battery comprising providing a positive electrode including a material that is capable of reversible intercalation/deintercalation of lithium ions as a positive active material; providing a negative electrode including a material selected from the group consisting of lithium metal, lithium-containing metal and a material that is capable of reversible intercalation/deintercalation of lithium ions as a negative active material; preparing an electrode assembly containing the positive and negative electrodes; putting the electrode assembly in a battery case; and injecting an electrolyte including a lithium salt, a carbonate-based organic solvent, and an isoxazole compound of the formula (1) into the battery case to fabricate a lithium secondary battery.

The positive and negative electrodes can be prepared by coating a slurry comprising the active materials on a current collector followed by drying and compressing the combination.

A separator may be interposed between the positive and negative electrodes of the electrode assembly. The separator may include a porous resin film such as polyethylene or polypropylene.

The method of preparing the battery may further include formation-charging at a high rate after fabrication of the battery. In contrast to the conventional lithium secondary battery that does not use an isoxazole additive compound as an electrolytic component, the lithium secondary battery of the present invention can be formation-charged at a high rate. The high-rate formation-charging can be performed by charging the fabricated battery for 180 to 240 min. at a rate of 0.5 to 1 C.

The following examples further illustrate the present invention in detail, but are not to be construed to limit the scope thereof.

EXAMPLES AND COMPARATIVE EXAMPLES

Example 1

After $LiCoO_2$ as a positive active material, polyvinylidenefluoride (PVdF) as a binder, and acetylene black as a conductive agent were mixed in a weight ratio of 92:4:4, a positive active material slurry was prepared by dispersing the mixture into N-methyl-2-pyrrolidone (NMP). The slurry was coated on a 20 μm thick aluminum foil, dried, and compressed, to thereby manufacture a positive electrode. After crystalline artificial graphite as a negative active material was mixed with PVdF as a binder in a weight ratio of 92:8, a negative active material slurry was prepared by dispersing the mixture in NMP. The slurry was coated on a 15 μm thick copper foil, dried, and compressed, to thereby manufacture a negative electrode. Together with a 25 μm thick polyethylene separator, the manufactured electrodes were wound and pressed, then placed into prismatic cans having the dimensions of 30 mm×48 mm×6 mm. 0.5 wt % isoxazole was added to a 1M $LiPF_6$ solution of a mixed solvent of ethylene carbonate:ethylmethyl carbonate (EC:EMC) in a volume ratio of 1:1 to prepare an electrolyte. The electrolyte was injected into the cans, thereby completing the fabrication of the lithium ion battery cell.

Example 2

A lithium ion battery cell was fabricated in the same manner as in Example 1, except that the electrolyte was prepared by adding 0.5 wt % isoxazole to a 1M $LiPF_6$ solution of mixed solvent of ethylene carbonate:ethylmethyl carbonate:fluorobenzene:propylene carbonate (EC:EMC:FB:PC) in a volume ratio of 3:5:1:1.

Example 3

A lithium ion battery cell was fabricated in the same manner as in Example 1, except that the amount of isoxazole added was 1 wt %.

Example 4

A lithium ion battery cell was fabricated in the same manner as in Example 1, except that the amount of isoxazole added was 2 wt %.

Example 5

A lithium ion battery cell was fabricated in the same manner as in Example 1, except that the electrolyte was prepared by adding 0.5 wt % isoxazole and hexafluorobenzene to a 1M $LiPF_6$ solution of a mixed solvent of ethylene carbonate:ethylmethyl carbonate (EC:EMC) in a volume ratio of 1:1. The volume ratio of isoxazole to hexafluorobenzene was 1:1.

Example 6

A lithium ion battery cell was fabricated in the same manner as in Example 1, except that the electrolyte was prepared by adding 0.5 wt % isoxazole and hexafluorobenzene to a 1M $LiPF_6$ solution of a mixed solvent of ethylene carbonate:ethylmethyl carbonate:fluorobenzene:propylene carbonate (EC:EMC:FB:PC) in a volume ratio of 3:5:1:1. The volume ratio of isoxazole to hexafluorobenzene was 1:1.

Example 7

A lithium ion battery cell was fabricated in the same manner as in Example 1, except that the fabricated battery was formation-charged at a high rate of 0.5C for 240 minutes.

Comparative Example 1

A lithium ion battery cell was fabricated in the same manner as in Example 1, except that isoxazole was not added to the solution.

Comparative Example 2

A lithium ion battery cell was fabricated in the same manner as in Example 1, except that a 1M $LiPF_6$ solution of a mixed solvent of ethylene carbonate:ethylmethyl carbonate:fluorobenzene:propylene carbonate (EC:EMC:FB:PC) in the volume ratio of 3:5:1;1 was used as an electrolyte.

Comparative Example 3

A lithium ion battery cell was fabricated in the same manner as in Example 1, except that the electrolyte was prepared by adding 0.5 wt % isoxazole to a 1M $LiPF_6$ solution of a mixed solvent of ethylene carbonate:dimethyl ether (EC:DME) in a volume ratio of 1:1.

Comparative Example 4

A lithium ion battery cell was fabricated in the same manner as in Example 1, except that the electrolyte was prepared by adding 0.5 wt % isoxazole to a 1M $LiPF_6$ solution of a mixed solvent of ethylene carbonate:tetrahydrofuran (EC:THF) in a volume ratio of 1:1.

Comparative Example 5

A lithium ion battery cell was fabricated in the same manner as in Example 1, except that the electrolyte was prepared by adding 0.5 wt % isoxazole to a 1M $LiPF_6$ solution of a mixed solvent of ethylene carbonate:acetonitrile (EC:AN) in a volume ratio of 1:1.

Decomposition voltages of the electrolytes used in Example 3 and Comparative Example 1 were measured by cyclic voltametry. The decomposition voltages are set forth in Table 1.

TABLE 1

|  | Decomposition voltage (V) |
| --- | --- |
| Example 3 | 0.75 |
| Comparative Example 1 | 0.5 |

The conditions for measurement of the decomposition voltages were as follows:

working electrode: mesocarbon fiber (MCF); reference electrode: Li-metal; counter electrode: Li-metal; voltage range: 3V to 0V; scan rate: 0.1 mV/s.

The electrolyte of Example 3 including isoxazole has a decomposition voltage higher than that of the electrolyte of Comparative Example 1 without isoxazole. The SEI film prevents an electrolytic organic solvent from decomposing, thereby inhibiting gas generation inside the cell. Therefore, the internal pressure of the cell decreases, and the incidence of increased thickness of the cell after full charging can be decreased.

The lithium ion battery cells of Examples 1, 2, 5, and Comparative Examples 2–5 were charged with a current of 170 mA to a cut-off voltage of 4.2V under constant current and constant voltage (CC-CV), allowed to sit for 1 hour, and then discharged to a cut-off voltage of 2.5V with a current of 170 mA. The initial charge/discharge efficiencies were measured and the results are shown in Table 2

TABLE 2

|  | Initial charge/discharge efficiencies |
| --- | --- |
| Example 1 | 91.5% |
| Example 2 | 91.8% |
| Example 5 | 91.8% |
| Comparative Example 2 | 85.2% |
| Comparative Example 3 | 34.5% |
| Comparative Example 4 | 71.2% |
| Comparative Example 5 | 83.4% |

As shown in Table 2, Examples 1, 2, and 5 using an electrolyte mixture of carbonate-based solvent and isoxazole showed more improved initial charge/discharge efficiencies than Comparative Example 2 without isoxazole and Comparative Examples 3–5 using an electrolyte containing a solvent other than a carbonate-based solvent.

The lithium ion battery cells of Examples 1–7 and Comparative Examples 1–5 were charged with a current of 170 mA to a cut-off voltage of 4.2V under constant current and constant voltage (CC-CV), allowed to sit for 1 hour, then discharged to a cut-off voltage of 2.5V with a current of 170 mA and allowed to sit for 1 hour. After 3 charge/discharge cycles were performed, the battery cells were charged with a current of 425 mA to a cut-off charge voltage of 4.2V over 2.5 hours. The rates of increase in the thickness of the cells after charging (relative to the thickness measured after fabrication of the cells) were measured. The results of Examples 1, 3, 4, and 5, and Comparative Example 1, are represented in Table 3.

TABLE 3

|  | Thickness-increase rate of cells after charging |
| --- | --- |
| Example 1 | 5.0% |
| Example 3 | 5.9% |
| Example 4 | 5.2% |
| Example 5 | 4.9% |
| Comparative Example 1 | 8.8% |

As shown in Table 3, the battery cells of the Examples according to the present invention show decreased thickness expansion rates compared with Comparative Example 1.

Figure 2:
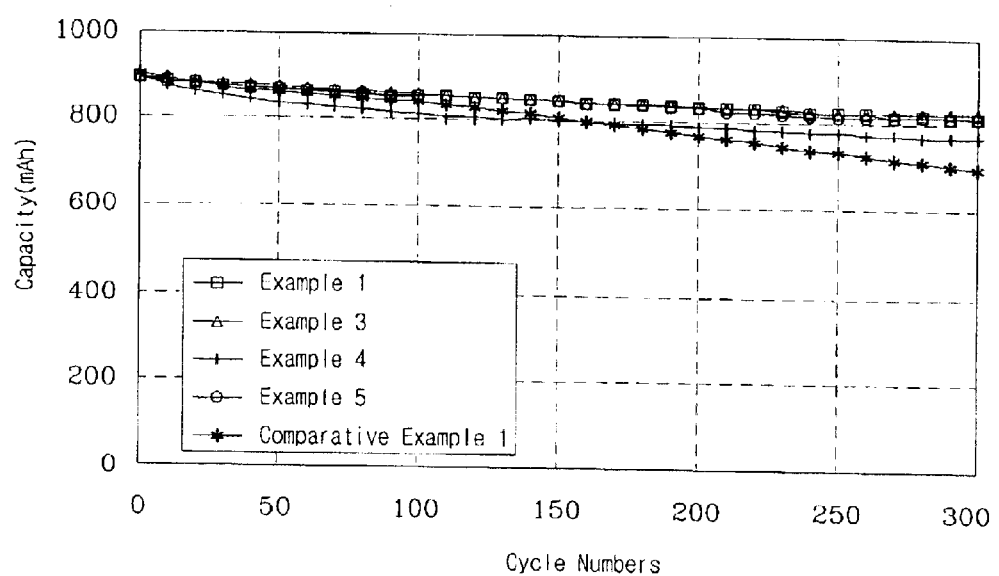
FIG. 2 is a graph illustrating cycle life characteristics of the battery cells according to Examples 1, 3, 4 and 5 of the present invention and Comparative Example 1.

The lithium ion battery cells, which were manufactured according to Examples 1 to 7 and Comparative Examples 1 to 5, were charged with a current of 800 mA to a cut-off voltage of 4.2V under CC-CV for 2.5 hours, and the cells were discharged with a current of 800 mA to a cut-off voltage under CC at 1C to 2.75V. 300 cycles of charge and discharge of the cells according to Examples 1, 3 to 5, and Comparative Example 1 were performed. The results are shown in FIG. 2. As shown in FIG. 2, the capacity of the cell of Comparative Example 1 decreased significantly during the charge and discharge cycles, but those of Examples 1 to 3 did not decrease nearly as much.

The isoxazole compound additive decomposes earlier than an electrolytic organic solvent during initial charging to react with lithium ions resulting in the formation of an organic SEI film, thereby inhibiting the decomposition of the electrolytic organic solvent. Therefore, the increase in the thickness of a prismatic battery or lithium polymer battery can be prevented during charging at room temperature or during high temperature storage after charging, since the generation of gas caused by the decomposition of the electrolytic organic solvent is inhibited during initial charging. In addition, the deterioration of charge and discharge capacity of the lithium secondary battery can be prevented, cycle life characteristics can be enhanced, and storage characteristics at high temperatures can be improved.

While the present invention has been described in detail with reference to particular embodiments, those skilled in the art will appreciate that various modifications and substitutions can be made thereto without departing from the spirit and scope of the present invention as set forth in the appended claims.

What is claimed is:

1. A lithium secondary battery comprising
a positive electrode including a material that is capable of reversible intercalation/deintercalation of lithium ions as a positive active material;
a negative electrode including a material that is capable of reversible intercalation/deintercalation of lithium ions as a negative active material; and an electrolyte including a lithium salt; a solvent consisting essentially of at least one carbonate-based organic solvent and at least one aromatic hydrocarbon solvent; and an isoxazole compound of the following formula (1):

(1)

2. The lithium secondary battery according to claim 1, wherein the positive electrode includes a lithiated intercalation compound selected from the group consisting of compounds represented by the following formulas (2) to (14):

$Li_xMn_{1-y}M_yA_2$ (2)

$Li_xMn_{1-y}M_yO_{2-z}X_z$ (3)

$Li_xMn_2O_{4-z}X_z$ (4)

$Li_xMn_{2-y}M_yA_4$ (5)

$Li_xCo_{1-y}M_yA_2$ (6)

$Li_xCo_{1-y}M_yO_{2-z}X_z$ (7)

$Li_xNi_{1-y}M_yA_2$ (8)

$Li_xNi_{1-y}M_yO_{2-z}X_z$ (9)

$Li_xNi_{1-y}CO_yO_{2-z}X_z$ (10)

$Li_xNi_{1-y-z}Co_yM_zA_\alpha$ (11)

$Li_xNi_{1-y-z}Co_yM_zO_{2-\alpha}X_\alpha$ (12)

$Li_xNi_{1-y-z}Mn_yM_zA_\alpha$ (13)

$Li_xNi_{1-y-z}Mn_yM_zO_{2-\alpha}X_\alpha$ (14)

wherein $0.9 \leq x \leq 1.1; 0 \leq y \leq 0.5; 0 \leq z \leq 0.5; 0 \leq \alpha \leq 2;$ M is at least one element selected from the group consisting of Al, Ni, Co, Mn, Cr, Fe, Mg, Sr, V, and rare earth elements;
A is at least one element selected from the group consisting of O, F, S, d P; and
X is at least one element selected from the group consisting of F, S, and P.

3. The lithium secondary battery according to claim 2, wherein the lithiated intercalation compound has an average particle size of 1 to 50 μm.

4. The Lithium secondary battery according to claim 1, wherein the lithium salt is at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$, wherein x and y are natural numbers, LiCl, and LiI.

5. The lithium secondary battery according to claim 1, wherein the lithium salt is used in a concentration ranging from 0.6 to 2.0M.

6. The lithium secondary battery according to claim 1, wherein the lithium salt is used in a concentration ranging from 0.7 to 1.6M.

7. The lithium secondary battery according to claim 1, wherein the carbonate-based solvent is at least one selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), methylisopropyl carbonate, ethylbutyl carbonate, diisopropyl carbonate, dibutyl carbonate, ethylene carbonate (EC), propylene carbonate (PC), and butylene carbonate (BC).

8. The lithium secondary battery according to claim 1, wherein the carbonate-based solvent comprises a cyclic carbonate and a chain carbonate.

9. The lithium secondary battery according to claim 1, wherein the aromatic hydrocarbon solvent is benzene or a compound represented by the following formula (15):

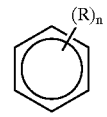

(15)

wherein R is a halogen or a C1–10 alkyl and n is an integer ranging from 1 to 5.

10. The lithium secondary battery according to claim 9, wherein n ranges from 1 to 3.

11. The lithium secondary battery according to claim 1, wherein the aromatic hydrocarbon solvent is at least one selected from the group consisting of benzene, fluorobenzene, toluene, trifluorotoluene, xylene, and mixtures thereof.

12. The lithium secondary battery according to claim 1, wherein the carbonate-based solvent and the aromatic hydrocarbon solvent are mixed in a volume ratio of 1:1 to 30:1.

13. The lithium secondary battery according to claim 1, wherein the battery is a lithium ion secondary battery or a lithium polymer battery.

14. The lithium secondary battery according to claim 1, wherein the isoxazole compound is added in an amount ranging from 0.1 to 10 wt % based on the total weight of the electrolyte.

15. The lithium secondary battery according to claim 1, wherein the isoxazole compound is added in an amount ranging from 0.5 to 2 wt % based on the total weight of the electrolyte.

16. The lithium secondary battery according to claim 1, wherein the aromatic hydrocarbon solvent comprises hexafluorobenzene.

17. The lithium secondary battery according to claim 16, wherein the mixed volume ratio of isoxazole: hexafluorobenzene is 10:1 to 1:10.

18. The lithium secondary battery according to claim 16, wherein the mixed volume ratio of isoxazole: hexafluorobenzene is 1:1 to 1:5.

* * * * *